W. J. HILL.
CAR BRAKE.
APPLICATION FILED APR. 20, 1910.

989,360.

Patented Apr. 11, 1911.

2 SHEETS—SHEET 1.

Witnesses
Jw. arlee
H. J. ——

Inventor
Wallace J. Hill.
By E. E. Vrooman,
Attorney.

W. J. HILL.
CAR BRAKE.
APPLICATION FILED APR. 20, 1910.

989,360.

Patented Apr. 11, 1911.

2 SHEETS—SHEET 2.

Witnesses

Inventor
Wallace J. Hill.
By E. E. Vrooman,
Attorney.

UNITED STATES PATENT OFFICE.

WALLACE J. HILL, OF MARION, OHIO.

CAR-BRAKE.

989,360.  Specification of Letters Patent.  Patented Apr. 11, 1911.

Application filed April 20, 1910. Serial No. 556,476.

*To all whom it may concern:*

Be it known that I, WALLACE J. HILL, a citizen of the United States of America, residing at Marion, in the county of Marion and State of Ohio, have invented certain new and useful Improvements in Car-Brakes, of which the following is a specification, reference being had therein to the accompanying drawing.

This invention relates to the subject of brakes for cars or other vehicles, and the principal object of the same is to provide novel manually controlled means which are operated by an axle of the vehicle to apply the brakes.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1:
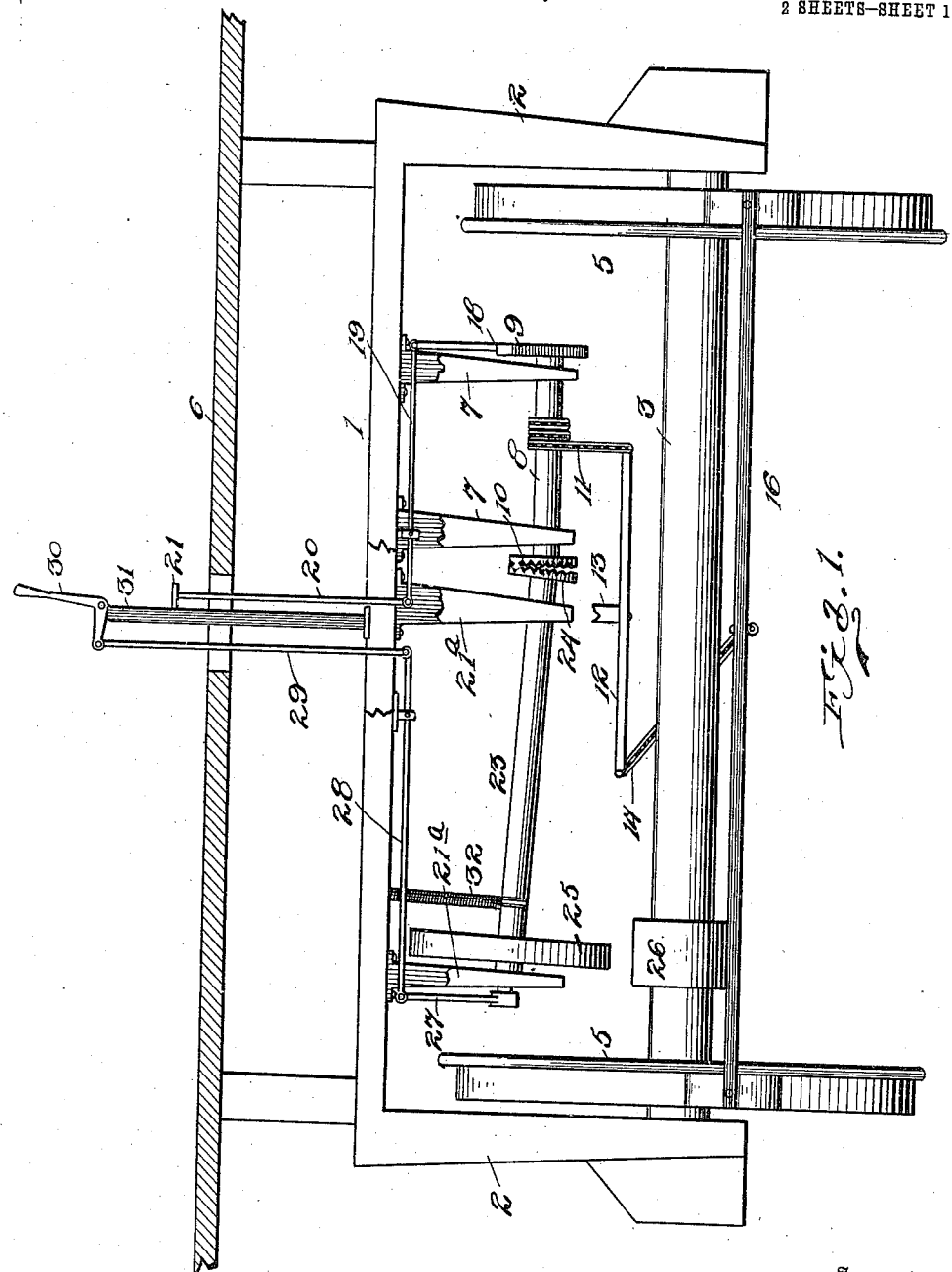
Figure 2:
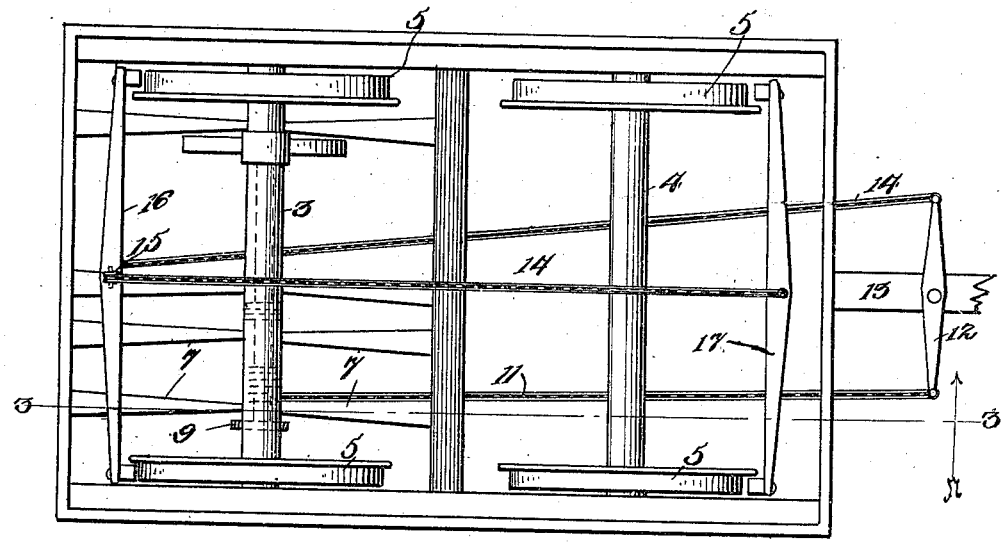
Figure 3:
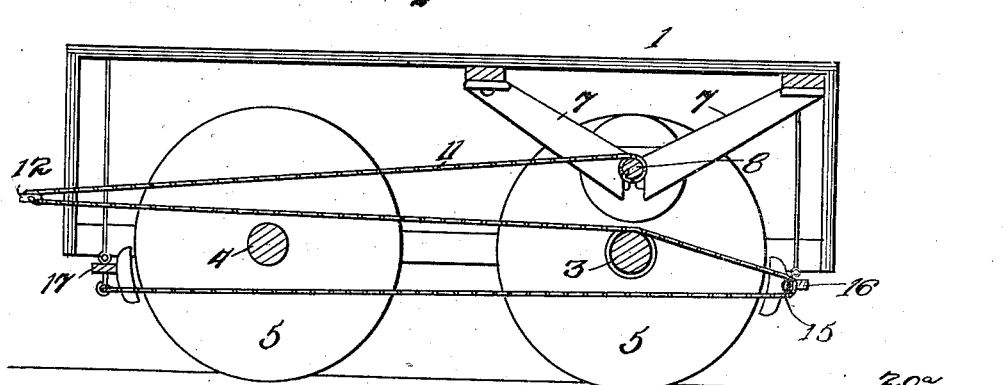
Figure 4:
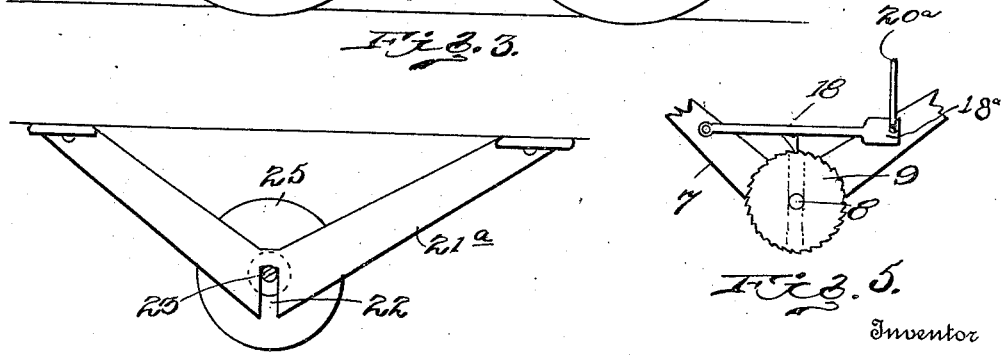
Figure 5:
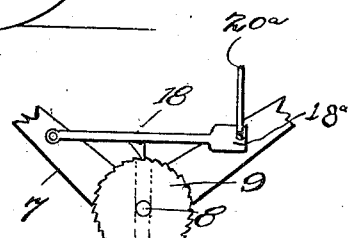

Figure 1 is a view in end elevation of a car truck equipped with the improved brake setting mechanism. Fig. 2 is a plan view. Fig. 3 is a vertical sectional view taken on the line 3—3, Fig. 2. Fig. 4 is a detail view of one of the hanger brackets for the power shaft. Fig. 5 is a detail view of a pawl and ratchet used in connection with the winding shaft.

Referring to said drawings by numerals, 1 designates the truck frame which is provided with the side hanger bearings 2 for the axles 3 and 4 which are equipped with the usual wheels 5. Said truck frame 1 supports the platform 6. Bracket bearings 7 are supported over one portion of axle 3 by the frame 1, said bearings carrying a winding shaft 8, the outer end of which is provided with a ratchet disk 9 and the inner end of which is provided with a clutch disk 10. A brake operating cable 11 has one end portion wound upon and fastened to shaft 8, said cable extending to and is fastened to one end of a lever 12 pivotally mounted on a beam 13 projecting from the rear end of said truck frame. The other end of said lever 12 has a cable 14 fastened thereto which extends to and passes over a pulley 15 carried by the forward brake beam 16, and from said pulley, the cable 14 extends to and is fastened to a rear brake beam 17. A gravity pawl 18 is pivotally connected to one end of a rocking lever 19 carried by frame 1. The other end of said lever is pivotally connected to an operating rod 20 that extends through platform 6 and is equipped with a foot plate 21, so that the attendant may depress said rod 20 and cause pawl 18 to disengage ratchet 9 and thereby allow rotation of winding shaft 8.

Bracket bearings 21ª are supported over axle 3 in alinement with brackets 7 by frame 1, said brackets 21ª, having bearing slots 22 in their lower ends in which a power shaft 23 is vertically movable. The inner end of power shaft 23 is provided with a clutch disk 24 similar to the disk 10 of winding shaft 8, and said disks are adapted for clutching engagement. A friction disk 25 is carried by the outer end portion of shaft 23, said disk being adapted for frictional engagement with a collar 26 carried by or formed integral with axle 3. The outer end of shaft 23 projects beyond its hanger bracket and is journaled in the lower end of the rod 27 the upper end of which is pivotally connected to one end of a rocking lever 28 carried by frame 1. The other end of lever 28 is pivotally connected to a rod 29 that projects through platform 6 and has a pivotal connection with a hand lever 30 pivotally mounted on a vertical standard 31 that is carried by frame 1 and projects through platform 6. The outer end portion of shaft 23 has a spring connection 32 with frame 1 the tension of which is constantly exerted to elevate the outer end portion of said shaft to disengage clutch disks 10 and 24, as is shown in Fig. 1.

In operation, it will be seen that by rocking hand lever 30 in one direction, shaft 23 will be lowered against the tension of spring 32 to place disk 25 in contact with collar 26, thereby transmitting power from axle 3 to shaft 23, and from said shaft through disks 10—24, to winding shaft 8, so that shaft 8 will set the brakes. When the brakes have been applied, lever 30 is released whereupon the spring 32 will automatically raise shaft 23 and disengage clutch disks 10—24. Pawl 18 being in engagement with ratchet 9, reverse rotation of shaft 8 is prevented. To release the brakes, rod 20 is depressed which disengages pawl 18 from ratchet 9, thereby permitting shaft 8 to reversely rotate and unwind cable 11, which releases the brakes.

What I claim as my invention is:—

1. A brake operating apparatus comprising a winding shaft, a brake setting cable connected thereto, a clutch disk carried by said shaft, a vertically movable power shaft, a clutch disk carried thereby, a friction disk on said power shaft, and means for adjusting said power shaft to cause the friction disk thereof to engage a vehicle axle and the clutch disk to engage the clutch disk of the winding shaft.

2. A brake operating apparatus comprising a power shaft, a winding shaft, means for placing said shafts in clutching engagement and causing the power shaft to be rotated by an axle, and brake setting means operated by the winding shaft.

3. A brake operating apparatus comprising a power shaft, a winding shaft, complemental clutch disks carried by said shafts, means for adjusting the power shaft to place said disks in engagement and for causing the power shaft to be operated by an axle, and brake setting means operated by said winding shaft.

4. In a brake operating apparatus, the combination with a truck and the brakes thereof, of a winding shaft journaled in said truck, a power shaft adjustably journaled in said truck, clutch disks carried by said shafts, manually controlled means for adjusting the power shaft to engage said disks, means for automatically unclutching said disks, a friction disk carried by the power shaft and adapted for engagement with an axle of said truck, brake setting means carried by the winding shaft, and manually controlled means for locking the winding shaft to prevent reverse rotation thereof.

5. In a brake operating apparatus the combination with a truck and the brakes thereof, of an axle for said truck provided with a collar, a winding shaft carried by the truck, a clutch disk carried thereby, a cable connecting between the winding shaft and the brakes, an adjustable power shaft carried by the truck, a friction disk carried by said shaft, a clutch disk also carried by said shaft, a hand lever for adjusting the power shaft to cause its disk to engage the disk of the winding shaft and the friction disk to engage the axle collar, a spring for automatically disengaging the power shaft from the winding shaft and the axle, and a manually controlled pawl and ratchet for preventing reverse movement of the winding shaft.

6. A brake operating device comprising an adjustable axle-driven power shaft, a winding shaft, manually controlled means for causing the power shaft to engage the winding shaft and an axle, automatically acting means for disengaging said power shaft from the axle and the winding shaft, and brake setting means connected to said winding shaft.

In testimony whereof I hereunto affix my signature in presence of two witnesses.

WALLACE J. HILL.

Witnesses:
THOS. P. FREELAND,
R. E. KNICKLE.

---

Copies of this patent may be obtained for five cents each, by addressing the "Commissioner of Patents, Washington, D. C."